April 7, 1970   D. W. BIRNSTINGL   3,504,541
DETECTOR HEADS
Filed Jan. 29, 1968
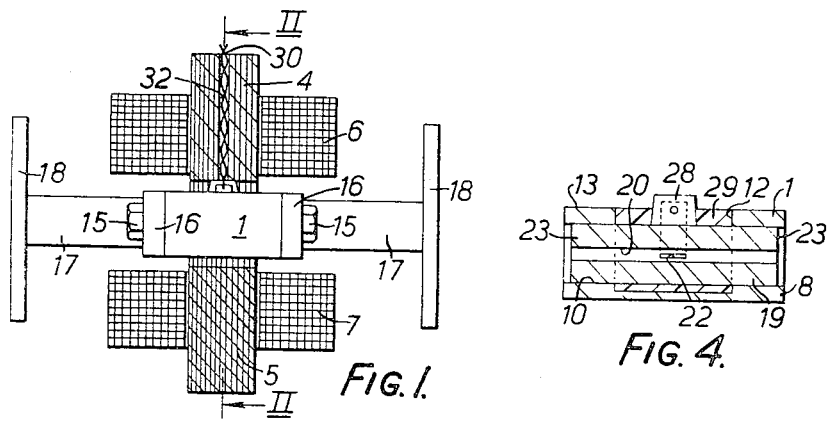
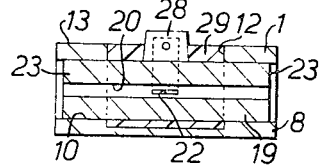
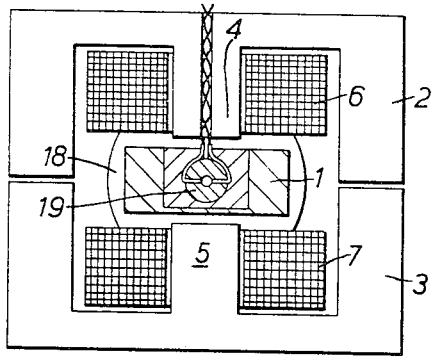
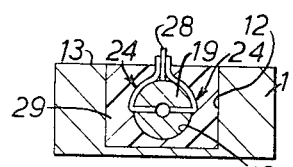
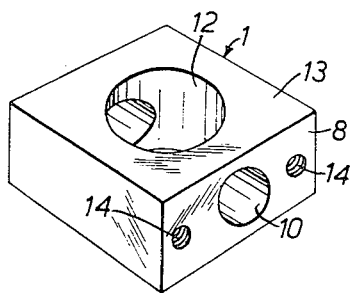
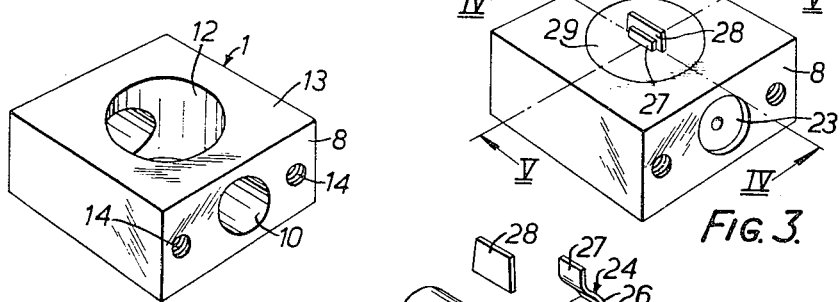
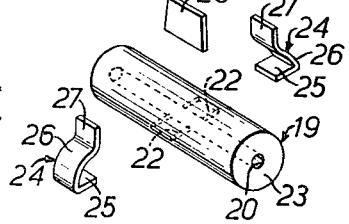
INVENTOR
DAVID WILDON BIRNSTINGL
BY Young & Thompson
ATTORNEYS

United States Patent Office 3,504,541
Patented Apr. 7, 1970

3,504,541
DETECTOR HEADS
David Wildon Birnstingl, Stroud, England, assignor to Mawdsley's Limited, Dursley, England
Filed Jan. 29, 1968, Ser. No. 701,451
Claims priority, application Great Britain, Feb. 4, 1967, 5,491/67
Int. Cl. G01p 5/08
U.S. Cl. 73—194                 8 Claims

ABSTRACT OF THE DISCLOSURE

An electromagnetic flowmeter head comprises a bored-out non-magnetic metal block within which is secured, by an insulating material moulded in situ, a tube for containing the liquid flow and two opposed electrodes preformed from metal strip and presenting opposed elongated contact surfaces the longitudinal axes of which are parallel to the longitudinal axis of the tube.

---

This invention relates to detector heads of the type embodying at least one electrode for electrical contact with a flowing liquid. It is of particular application to such heads of small bore, for example of less than ½ inch diameter, and is of special but by no means exclusive application to the detector head of an electromagnetic flowmeter employing the usual arrangement of two diametrically opposed electrodes.

Detector heads of the type concerned normally employ electrodes having a circular contact area, and with small bores there is a tendency for gas bubbles to form on the electrode surface. This is particularly so at zero flow conditions, and once a small bubble forms it tends to provide a nucleus at which further gas entrained in the liquid is released so that the bubble increases in size and may completely cover and insulate the electrode. One of the objects of the invention is to overcome or at least materially reduce the problem of bubble formation; another object is to improve the electrical characteristics as will be made clear hereinafter.

According to one aspect of the invention a detector head has a through bore for the liquid flow and an electrode mounted in the wall of the bore with a contact surface which is elongated with a longitudinal axis which extends generally parallel to the longitudinal axis of the through bore. It has been found that the use of electrodes elongated in this manner, particularly with very small bores, materially reduces bubble formation; even if small bubbles form they break away and leave the electrode before reaching a sufficient size to cover the surface.

As applied to an electromagnetic flowmeter the head will employ two diametrically opposed electrodes of the described elongated form and each electrode is conveniently fabricated from metal strip and positioned in a corresponding one of two longitudinally extending slots in the wall of the bore so that one edge of the strip is exposed within the bore for electrical contact with a liquid passing through the bore. In a preferred construction the bore is provided by a tube of an insulating material and the tube, together with the electrodes in position, is retained in a bored-out non-magnetic metallic block by means of an insulating material which is moulded in situ so as to locate and secure both the electrodes and the tube with respect to the block. Each strip conveniently extends externally of the tube so that an outer end thereof projects through the moulded-in insulating material and is accessible for electrical connection.

A suitable insulating material for casting or moulding is an epoxy resin, and the block may have a through bore for accommodating the tube and an intersecting blind bore which extends from one side of the block and in which the insulating material is moulded.

Alternatively, the electrodes may be cast or moulded in position in a block of insulating material the bore of which is subsequently cleaned out to size, for example by reaming, with the sizing operation exposing the final elongated electrode contact area.

According to another aspect of the invention an electromagnetic flowmeter head comprises a bored-out non-magnetic metal block within which is secured, by an insulating material moulded in situ, a tube for containing the liquid flow and at least one electrode extending through an aperture in the tube wall for electrical contact with the liquid flow. As before, the electrode is preferably one of two such opposed electrodes elongated axially of the tube.

The increased contact area of the electrodes provides the improved electrical characteristics previously referred to, and this results from the lowered electrode to earth and inter-electrode impedances which are obtained. These impedances can be considered as forming limbs of potential dividers from which stray pick-up voltages and the electrode signal voltage are respectively fed to the associated measuring circuit, and lowering the impedances results in an increased effective signal voltage and a decreased effective pick-up voltage.

The invention will now be further described with reference to the accompanying drawings which show, by way of example, a small bore electromagnetic flowmeter head embodying the invention. In the drawings:

FIGURE 1 is a side view of the head, with parts shown in longitudinal axial sectional view, FIGURE 2 is a sectional view on the line II—II of FIGURE 1, FIGURE 3 is a perspective view of a sub-assembly of the head, FIGURES 4 and 5 are respectively sectional views on the lines IV—IV and V—V of FIGURE 3, and FIGURE 6 is a perspective "exploded" view of the sub-assembly.

The head comprises a non-magnetic metallic block 1 surrounded by two laminated metal yoke members 2 and 3 which have central limbs 4 and 5 around which are wound energising coils 6 and 7 respectively. When the coils are energised, magnetic flux passes through the block 1 and between the central limbs 4 and 5, the E-shaped yoke members 2 and 3 providing return magnetic paths for the flux. In FIGURE 2 air gaps are shown between the two members 2 and 3, these gaps merely providing small dimensional tolerances which facilitate connection of the members 2 and 3 to a support structure (not shown).

As shown particularly in FIGURE 6, the block 1 has rectangular end faces 8 between which extends a central through bore 10 the longitudinal axis of which is perpendicular to and intersects the axis of a relatively large diameter blind bore 12 bored from a top face 13 of the block. Each end face 8 is provided with tapped bores 14 for securing, by means of connecting screws 15 (FIGURE 1), a flanged inner end 16 of a corresponding one of two short lengths of connecting pipe 17 the outer ends of which have connecting flanges 18 for bolting into a pipeline (not shown). The longitudinal axes of the lengths of pipe 17 are aligned with the longitudinal axis of the bore 10.

A thick walled tube 19 is of a solid insulating material and has a central bore 20 for accommodating the liquid flow and two opposed slots 22 which are elongated axially of the bore 20 and which break into the latter. On assembly of the head, the tube 19 is inserted into the bore 10, within which it is a close fit, with each face 23 of the tube 19 being slightly recessed behind the corresponding end face 8 of the block 1, as shown in FIGURE 4. The recesses thus formed accommodate O-rings or sealing washers which are inserted between each end face 23 and the corresponding flange 16 on assembly of the head. The blind bore 12 renders the two slots 22 accessible for the respective insertion of two electrodes 24 performed from metal strip.

An inner end 25 of each electrode 24 fits within the corresponding slot 22 so that the electrode 24 presents an elongated contact surface within the bore. An intermediate curved portion 26 of each electrode fits closely against the outer surface of the tube 19 and adjoins an outer end 27 which, as shown in FIGURE 5, projects beyond the plane of the top face 13 of the block 1. An insulating spacer 28 is positioned between the two outer ends 27, after which the space within the blind bore 12 and surrounding the tube 19 and electrodes 24 is filled with an insulating material 29, such as an epoxy resin, which is thereby moulded in situ and acts to retain the tube 19, the electrodes 24 and the spacer 28 in position. In addition, the insulating material 28 provides insulation between the block 1 and the electrodes 24, the extremities of the outer ends 27 of which are accessible for connection to an electrical circuit (not shown), the connecting wires 30 (FIGURES 1 and 2) being soldered to the electrodes 24 and led out as a twisted pair through an aperture 32 in the limb 4. Apart from the provision of the aperture 32 in the limb 4, the two members 2 and 3 are identical.

I claim:

1. An electromagnetic flowmeter head comprising a body with a through bore for accommodating liquid flow in a direction parallel with a longitudinal axis of the bore, the body having a wall through which extend two slots which break into the bore or mutual opposite sides of the latter, and two electrodes formed of metal strip and respectively located in the two slots, each electrode having a contact surface flush with the bore and provided by an end surface of a strip providing the corresponding one of said electrodes, with the two contact surfaces being mutually opposed and elongated in directions parallel to said axis.

2. An electromagnetic flowmeter head according to claim 1, wherein said body is a cylindrical tube of an insulating material.

3. An electromagnetic flowmeter head according to claim 2 and including a bored-out non-magnetic metallic block within which the tube and the electrodes are retained by an insulating material.

4. An electromagnetic flowmeter head according to claim 3, wherein the insulating material is moulded in situ.

5. An electromagnetic flowmeter head according to claim 3, wherein the block has a through bore accommodating the tube and a mutually perpendicular and intersecting blind bore within which the electrodes are disposed.

6. An electromagnetic flowmeter head according to claim 5, wherein each electrode strip has an inner end within the corresponding slot and terminating in the associated contact surface, an intermediate portion which is of arcuate shape and fits against an external portion of the tube and an outer end which is accessible for external connection.

7. An electromagnetic flowmeter head according to claim 6, wherein said two outer ends are insulated from one another by means of a spacer strip.

8. An electromagnetic flowmeter head according to claim 3, wherein the block is surrounded by two E-shaped pole pieces, two centre limbs of which lie on diametrically opposite sides of the bore and support field coils.

References Cited

UNITED STATES PATENTS

| 1,249,530 | 12/1917 | Smith et al. | |
| 3,034,002 | 5/1962 | Carlson. | |
| 3,343,414 | 9/1967 | Cason | 73—194 |
| 3,387,492 | 6/1968 | Mannherz et al. | 73—194 |

FOREIGN PATENTS

| 1,016,923 | 1/1966 | Great Britain. |

OTHER REFERENCES

German printed application, No. 1,220,160, June 1966.

CHARLES A. RUEHL, Primary Examiner